United States Patent [19]

Williams

[11] Patent Number: 5,737,594

[45] Date of Patent: Apr. 7, 1998

[54] METHOD FOR MATCHING ELEMENTS OF TWO GROUPS

[75] Inventor: Ross Neil Williams, Hazelwood Park, Australia

[73] Assignee: Trustus Pty Ltd., Adelaide, Australia

[21] Appl. No.: 525,281

[22] Filed: Jul. 5, 1995

[30] Foreign Application Priority Data

Jul. 5, 1994 [AU] Australia ................ 66168/94

[51] Int. Cl.⁶ ........................................ G06F 17/30
[52] U.S. Cl. ........................................ 395/606
[58] Field of Search ............................... 395/606

[56] References Cited

U.S. PATENT DOCUMENTS

| | | | |
|---|---|---|---|
| 5,119,291 | 6/1992 | Flannagan et al. | 395/404 |
| 5,276,776 | 1/1994 | Grady | 395/64 |
| 5,339,435 | 8/1994 | Lubkin et al. | 395/701 |
| 5,371,885 | 12/1994 | Letwin | 395/621 |
| 5,440,482 | 8/1995 | Davis | 395/606 |
| 5,495,603 | 2/1996 | Fruchtman et al. | 395/616 |
| 5,495,607 | 2/1996 | Pisello et al. | 395/610 |

*Primary Examiner*—Thomas G. Black
*Assistant Examiner*—Maria N. Von Buhr

[57] ABSTRACT

A method for matching-elements of two groups of data objects whose elements do not necessarily exactly match. The method consists of examining successively more abstract projections of the two groups until exact matches occur within elements of the same group, or between elements of the different groups or until there are no longer any more abstract projections to apply. Both random access end sequential embodiments are described.

7 Claims, 2 Drawing Sheets

METHOD FOR MATCHING ELEMENTS OF TWO GROUPS

BACKGROUND

The problem of performing inexact matches typically arises when a group of data elements have been corrupted or transformed for some purpose and must be compared with their originals.

In particular, the problem arises when comparing the group of names of a group of files that have been transferred from a computer running one operating system to a computer running a different operating system. For example, if a group of five files were transferred from Unix to MSDOS, the two groups of filenames might be:

| UNIX | => | MSDOS |
|---|---|---|
| aardvark_database.database | => | AARDVARK.DAT |
| emu | | EMU |
| playpuses.text | => | PLATYPUS.TEX |
| sloth.data | => | SLOTH.DAT |
| walrus_document.tex | => | WALRUS_D.TEX |

The present invention allows the elements of two such lists to be correctly paired. The techniques no be described in this patent specification are also applicable to paths (e.g. "/sloth/walrus/") and pathnames (e.g. "/sloth/walrus/aardvark.dat"), of which filenames form a component. In this patent specification the term "file specification" will be used to refer to all data elements that partially or fully identify a file or a group of files in a computer system. The term encompasses, but is not limited to, paths, filenames, and pathnames.

The invention is, however, applicable to far more than file specifications, allowing groups of any type of data element to be matched.

SUMMARY OF THE INVENTION

The problem of matching two groups of data elements exactly is straightforward. By various means, the elements of the two groups can be compared and the pairs that match identified. However, if the elements of the two groups do not exactly match, the problem becomes more difficult. For example, consider the problem of matching elements of the following two groups of strings:

| goanna | goanna |
|---|---|
| goanna | goanna |
| kangaroo_one | kangaroo |
| kangaroo_two | sloth |
| sloth | walrus2 |
| walrus | zoo |
| zebra | |

By inspection it seems clear that (sloth,sloth) should be matched, as they are identical. Similarly, it makes sense to match (walrus,walrus2), as they are nearly identical. The other names are more difficult to assess. It's clear that "zebra" corresponds, in some sense, to "zoo" as they are the only two strings that start with "z", and neither "looks like" any of the other strings. However, should they be matched just because they share the first letter? The kangaroo strings pose a different problem. In the absence of "kangaroo_one", it would make sense to form the match (kangaroo_two, kangaroo). However, as both "kangaroo_one" and "kangaroo_two" appear in the first group, it is not clear which one should be matched with "kangaroo". Finally, the two pairs of "goanna" are identical, but probably shouldn't be matched, as it is not clear which of the two possible pairings to make (straight or crossed).

The problems encountered in the example are summarized as follows:

(a) What if two elements in the same group are identical?

(b) How similar must two elements be to match?

(c) How should we define "similar"?

(d) What if an element A in one group is close enough to match element B in the second group, but is even closer to C in the first group?

In problem (a) where two or more data elements in the same group are identical, none of the identical elements should be matched to any element, as it could never be clear which one should match a candidate element in the other group. This resolves the goanna/goanna problem.

The other problems are somewhat more difficult and are solved in this invention by defining a DISTANCE METRIC which is a function of two data element arguments d(A,B) that returns a number being the "distance" between the two arguments. For example, in the example above, if we defined the distance to be 0 for identical strings, and otherwise the inversion of the number of characters in the longest common prefix of the two argument strings, then the distance between "walrus" and "walrus" would be 0, the distance between "zebra" and "zoo" would be 1/1 which is 1, and the distance between "kangaroo_one" and "kangaroo" would be 1/8, which is 0.125.

The concept of distance can also be used to define the concept of "closeness", and in this patent specification closeness is defined to be a property that is inversely related to distance.

A distance metric exemplifies the concept of "distance". With this in place, we can solve the zebra/zoo problem (b) by defining a maximum distance T that two strings can be apart and still be matched. The distance metric also provides an approach to solving the final problems. In problem (d), A should not match B.

The invention incorporates all these solutions to provide a method for matching, within a specified tolerance (by the distance metric), two groups of data elements.

DETAILED DESCRIPTION OF THE PREFERRED EMBODIMENT

Figure 1:
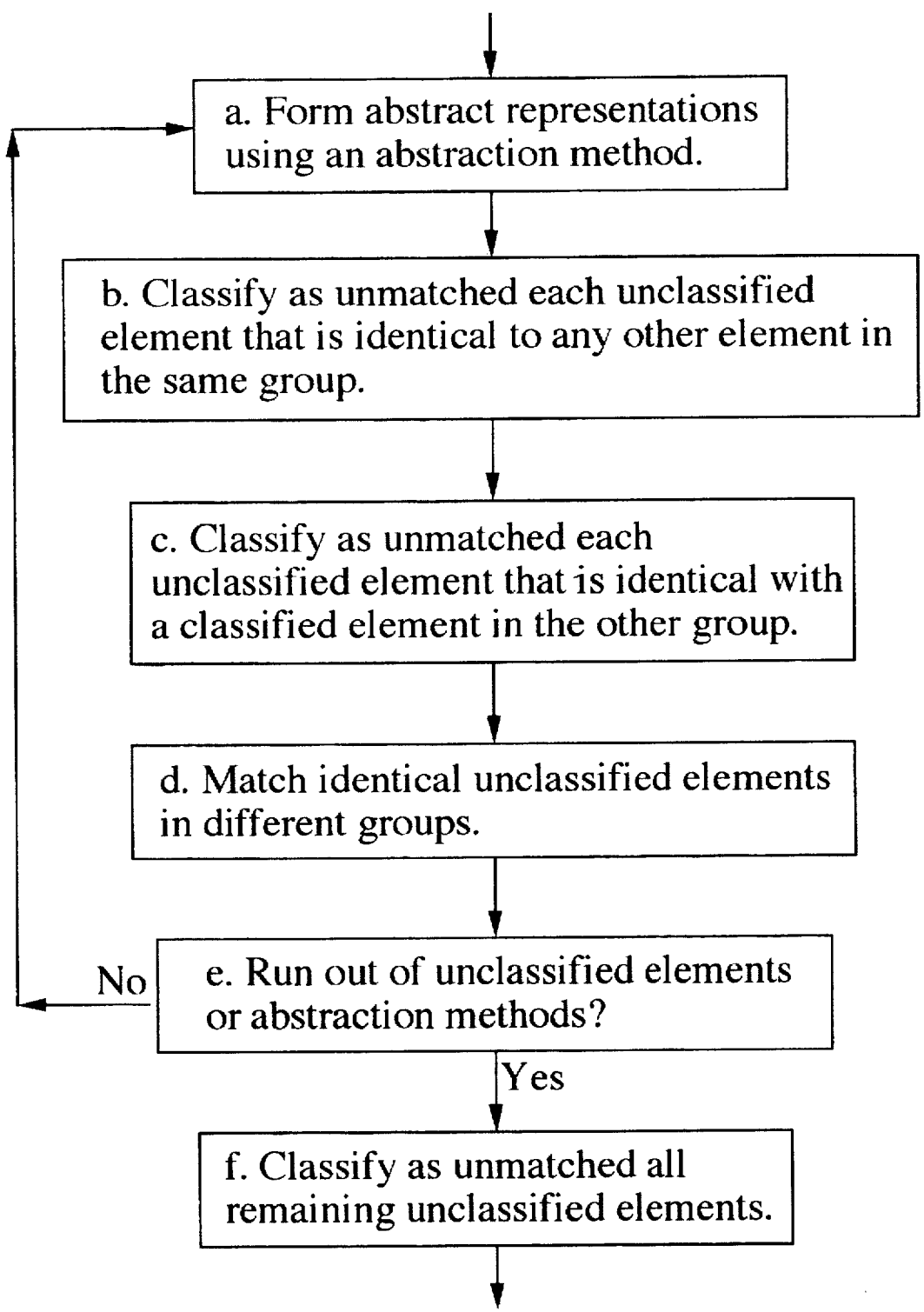
FIG. 1 depicts a flowchart of the preferred embodiment of the instant method for matching elements of two groups of data elements.
Figure 2:
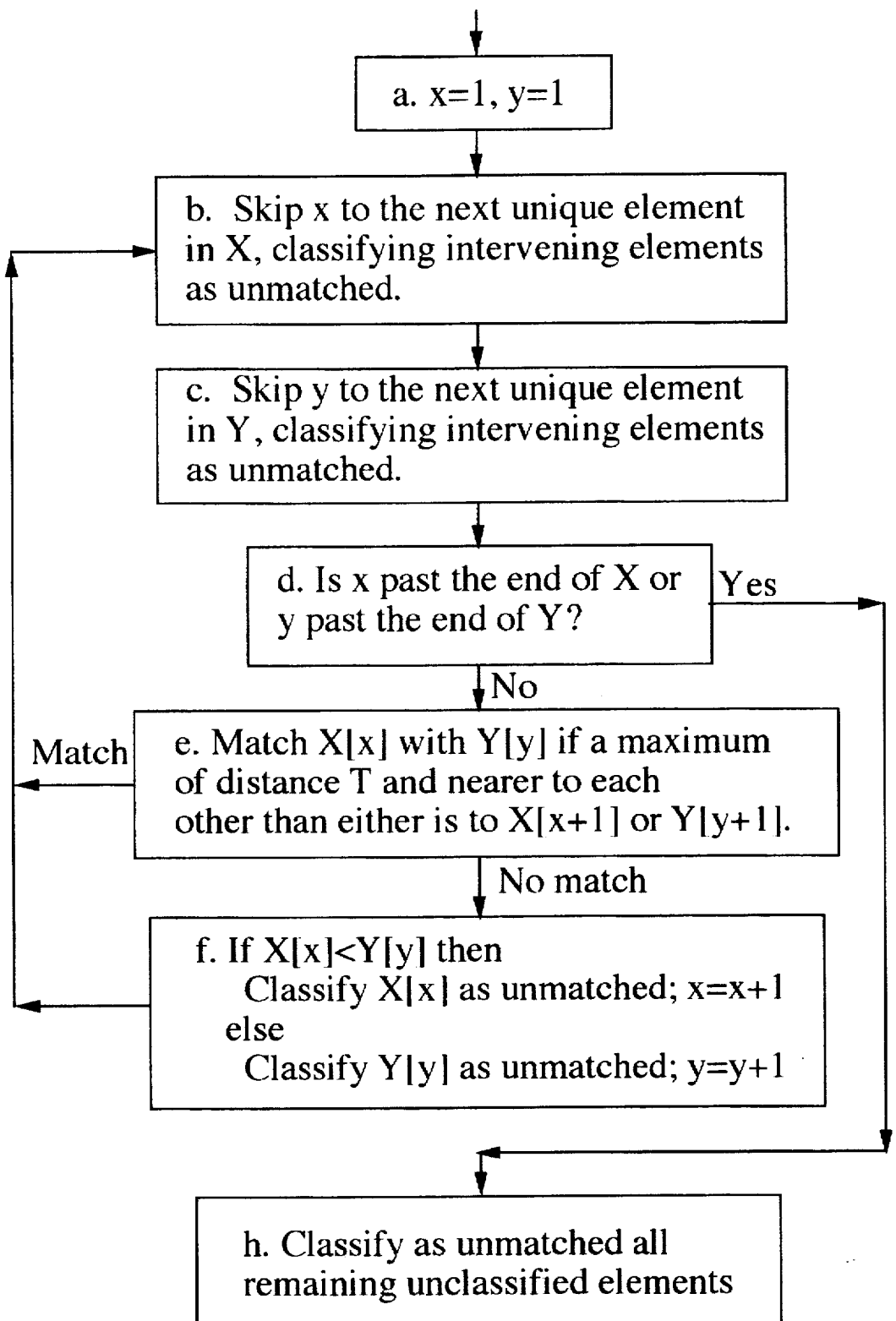
FIG. 2 depicts a flowchart of the preferred embodiment of the instant method for matching elements of two ordered lists formed from two groups of data elements.

In a broad aspect of the invention, a method, shown in FIG. 1, and, shown in FIG. 2, for matching elements of two groups A and B of data elements, comprises the step of:

a. identifying matches between pairs of elements that are closer to each other than either element in the pair is to any other element in either group, and such that each pair contains an element from group A and an element from group B.

In a further aspect of the invention, a data element is a file specification.

In a further aspect of the invention, a method for matching elements of two groups of data elements, comprises the steps of:

a. forming an abstract representation of each of the groups according to one of a set of abstraction methods (101);

b. classifying as UNMATCHED each element of the abstract representation that is identical to another element of the abstract representation within its own group (102);

c. classifying as UNMATCHED each element of the abstract representation in each group that is identical to an element of the abstract representation of the other group that is already classified as MATCHED or UNMATCHED (103);

d. classifying as MATCHED, and identifying a match between, each pair of identical elements of the abstract representation such that one element of the pair is in one group and the other element is in the other group and each element of the pair is not classified as MATCHED or UNMATCHED (104);

e. repeating steps a through d until all elements of both groups have been classified as MATCHED or UNMATCHED, or until all abstraction methods in the set of abstraction methods have been used (105);

f. classifying as UNMATCHED all elements that are not already classified as MATCHED or UNMATCHED (106).

In a further aspect of the invention, where the data elements are file specifications, one of the set of abstraction methods may preferably comprise the removal of the "version number" of the file specification (e.g. removal of ";67" in "sloth.dat;67").

In a further aspect of the invention, where the data elements are file specifications, one of the set of abstraction methods may preferably comprise the normalization of the alphabetic case of the file specification (e.g. conversion of "SLOTh.dAt" to "SLOTH.DAT").

In a further aspect of the invention, where the data elements are file specifications, one of the set of abstraction methods may preferably comprise the removal of any trailing "." of the file specification (e.g. conversion of "SLOTH." to "SLOTH").

In a further aspect of the invention, where the data elements are file specifications, one of the set of abstraction methods may preferably comprise the truncation of the file specification extension to a predetermined number of bytes (e.g. conversion of "SLOTH.DATA" to "SLOTH.DAT").

In a further aspect of the invention, where the data elements are file specifications, one of the set of abstraction methods may preferably comprise the truncation of the file specification identifier to a predetermined number or bytes (e.g. conversion of "SLOTH_DOCUMENT.DAT" to "SLOTH_DO.DAT").

In a further aspect of the invention, a method for sorting a group of file specifications of an operating system in such a way that the order of the file specifications is unlikely to change if the group is moved to a different operating system, comprises the step of:

a. sorting the file specifications of said group by two keys, the first being the case-normalized (upper or lower case) representation of each file specification, and the second being the file specification, with the first key dominating the second.

In a further aspect of the invention, a method for representing and sorting a group of file specifications as provided on an operating system in such a way that the order of the file specifications is unlikely to change if the group is moved to a different operating system, comprises the steps of:

a. forming a representation of the group of file specifications by replacing each directory path component delimiter (if any) of the file specification by a standard character (e.g. convert "[sloth.walrus]" to "/sloth/walrus/");

b. sorting the file specifications in the group by two keys, the first being the case-normalized (upper or lower case) representation of the file specification, and the second being the file specification, with the first key dominating the second.

In a further aspect of the invention, a method, shown in FIG. 1, and, shown in FIG. 2, for matching elements of two ordered lists X and Y formed from two groups of data elements, comprises the steps of:

a. initializing an index x into the first list X, and an index y into the second list Y, setting them both to 1 (201);

b. classifying as UNMATCHED, elements x . . . x+n (where n>=0) such that each element x . . . x+n−1 is identical to either its predecessor or successor element and element x+n is not identical to its predecessor or successor element, and incrementing x by n (202);

c. performing step (b) for y in the second group (203);

d. if one or both of x and y has run off the end of its list, skipping to step h (204);

e. if the distance d(X[x],Y[y]) is at most a maximum distance T, and X[x] and Y[y] are closer to each other than either is to either X[x+1] or Y[y+1], then classifying elements X[x] and Y[y] as MATCHED with each other, incrementing x and y by 1, and skipping to step b (205);

f. Classifying the lower in the sort order of X[x] and Y[y] as UNMATCHED and incrementing its corresponding index by 1 (206);

g. repeating steps b to f until one or both of x and y has run off the end of its list (209);

h. classifying as UNMATCHED all elements that are not already classified as MATCHED or UNMATCHED (208).

The following embodiments should not be interpreted as a limitation on the scope of the claims of this patent.

The most obvious way to implement the invention is to calculate the distance between all pairs of elements within both groups, and then sort all these pairs by distance. Unfortunately, this is an O(mn) operation (where n and m are the number of elements in each group respectively) and so could be very time consuming if m and n are large.

SEQUENTIAL

A far more tractable solution (the SEQUENTIAL embodiment) becomes available if the distance metric is constrained to be compatible with a sort order. If the elements of each group can be partially or fully sorted by some criteria so that we can express inequalities such as A<B, then the distance metric is compatible if and only if (iff)

$$A<=B<=C \text{ implies } d(A,B)<=d(A,C)$$

In this embodiment, the elements of each group are first sorted each into a list of elements, in accordance with the sort order. A single pass is then made simultaneously through both lists. At each step, the current pair of elements, one from each list, are compared with each other and with their successor elements, with the aim of establishing the condition "must be closer to the opposing candidate than to any other element in either group".

| list1 | list2 |
|---|---|
| . . . | . . . |
| l | l |
| A | B |

| list1 | list2 |
|---|---|
| \| | \| |
| \| | \| |
| C | D |
| \| | \| |
| ... | ... |

Because previous elements have already been processed, only the next element needs to be checked. In the diagram, to determine if A matches B, the only distances that need to be calculated are AB, AD, and BC.

The cost of this method is $O(nLOG(n)+mLOG(m)+n+m)$, which is much better than $O(mn)$. If the elements are already sorted, the method becomes linear in m and n ($O(m+n)$).

RANDOM ACCESS

Another way to make the solution tractable is to approach the concept of distance in a different way. This leads to the RANDOM ACCESS embodiment. Suppose that the set of all matching distances is a small set of non-negative integers. [0,P] (where P is analogous to T) and that it is computationally cheap to find all pairs that are at any particular distance. Then a preferred method to perform the match is to start with d=0 and increment d until d=P, at each increment identifying all the pairs of exactly distance d. Because at any d, all distances 0 ... d−1 have already been considered, we can be sure that each element of each pair that match at exactly distance d does not match any other element at a shorter distance.

One interesting way to define the distance between two elements is as the number of incremental information removal methods (from the set of information removal methods R_0 ... R p) that must be applied before the two elements become identical. For example, for two elements X and Y, if R_0(X) <>R_0(Y) and R_1(R_0(X))<>R_1(R_0 (Y)), but R_2(R_i(R O(X)))=R_2(R_1(R_0(Y))), then the distance would be 2. Note: R0 is the identity function.

If we then construct a sort order that is consistent with this distance metric, then we can construct a sequential algorithm from the random access one. A consistent sort order can be defined by mapping each data element X to a key K being the ordered tuple (Kp, ... ,K1, K0) where K0=R_O(X) and Ki=R_i(Ki−1). The sorting is then performed with Ki dominating Ki−1, and with the sort order for each K_i not marketing, so long as it is a deterministic complete ordering.

To prove that the distance metric is consistent with the key ordering:
Consider three elements X, Y, and Z that have been sorted (XYZ) by the sort order. Suppose that D(X,Z)<D(X,Y). Then X and Z must share more leading (i.e. Kp..) K's than X and Y. This implies that X and Z have the same value for the key K_D(X,Y)−1, but Y does not have that value. This means that Y could not possibly come between X and Z in the sort order, which breaks the premise. Thus, if X, Y and Z appear in that order in the sorting order then D(X,Z)>= D(X,Y), which proves that the sorting order is compatible with the distance metric, and when this is true, a sequential algorithm such as the one described earlier can be constructed.

Thus, while the information removal approach would appear to be most closely aligned with the random access approach, it can always be implemented as a sequential algorithm.

I claim:

1. A method for matching elements of two groups of data elements, comprises the steps of:

a. forming an abstract representation of each of the groups according to one of a set of abstraction methods;

b. classifying as UNMATCHED each unclassified element of said abstract representation that is identical to any other element of said abstract representation within its own group;

c. classifying as UNMATCHED each unclassified element of said abstract representation in each group that is identical to an element of said abstract representation of the other group that is already classified as MATCHED or UNMATCHED;

d. classifying as MATCHED, and identifying a match between, each pair of identical elements of said abstract representation such that one element of the pair is in one group and the other element is in the other group and each element of the pair is not classified as MATCHED OR UNMATCHED;

e. repeating steps a through d until all elements of both groups have been classified as MATCHED or UNMATCHED, or until all abstraction methods in said set of abstraction methods have been used;

f. classifying as UNMATCHED all elements that are not already classified as MATCHED or UNMATCHED.

2. The method in accordance with claim 1 wherein the data elements are file specifications and one of the set of abstraction methods is the removal of the "version number" of the file specification.

3. The method in accordance with claim 1 wherein the data elements are file specifications and one of the set of abstraction methods is the normalization of the alphabetic case of the file specification.

4. The method in accordance with claim 1 wherein the data elements are file specifications and one of the set of abstraction methods is the removal of any trailing "." of file specification.

5. The method in accordance with claim 1 wherein the data elements are file specifications and one of the set of abstraction methods is the truncation of the file specification extension to a predetermined number of bytes.

6. The method in accordance with claim 1 wherein the data elements are file specifications and one of the set of abstraction methods is the truncation or the file specification identifier to a predetermined number of bytes.

7. A method for matching elements of two ordered lists X and Y formed from two groups of data elements, comprises the steps of:

a. initializing an index x into the first list X, and an index y into the second list Y, setting them both to 1;

b. classifying as UNMATCHED, elements x ... x+n (where n>=0) such that each element x ... x+n−1 is identical to either its predecessor or successor element, and element x+n is not identical to its predecessor or successor element, and incrementing x by n;

c. performing step (b) for y in the second group;

d. if one or both of x and y has run off the end of its list, skipping to step h;

e. if the distance d(X[x],Y[y]) is at most a maximum distance T, and X[x] and Y[y] are closer to each other than either.is to either X[x+1] or Y[y+1], then classifying elements X[x] and Y[y] as MATCHED with each other, incrementing x and y by 1, and skipping to step b;

f. classifying the lower in the sort order of X[x] and Y[Y] as UNMATCHED and incrementing its corresponding index by 1;

g. repeating steps b to f until one or both of x and y has run off the end of its list;

h. classifying as UNMATCHED all elements that are not already classified as MATCHED or UNMATCHED.

* * * * *